Patented Nov. 3, 1925.

1,559,791

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PROCESS FOR MAKING CELLULOSE-COMPOSITION-MATERIAL SPECTACLE AND EYEGLASS FRAMES.

No Drawing. Application filed February 19, 1924. Serial No. 693,922.

*To all whom it may concern:*

Be it known that I, ELMER L. SCHUMACHER, a citizen of the United States, residing at Southbridge, in the county of Worcester and State of Massachusetts, have invented certain new and useful Improvements in Processes for Making Cellulose-Composition-Material Spectacle and Eyeglass Frames, of which the following is a specification.

The present invention relates to an improved process for the manufacture of spectacle and eyeglass frames, and the like, from a cellulose composition material.

A very important object of this improved process is to provide a method for the manufacture of spectacle and eyeglass frames and the like from cellulose composition material while such material is in an unseasoned state, thereby making a great saving of material as well as making a very noticeable reduction in the cost of such manufacture.

Another very important object of this invention is to provide a process wherein spectacle and eyeglass frames, and the like, may be stamped or otherwise blanked out from green stock cellulose material, after which the scrap may be re-worked and issued from the machine as first grade stock to be reblanked and so on as many times as required, so that there will be no wastage occasioned from the scrap material.

Another very important object of this invention is to provide a process of forming spectacle and eyeglass frames and the like from cellulose composition material by stamping or otherwise forming the same from unseasoned stock, so that the scrap material may be put back and re-worked, the said blank after being stamped out from the green stock material then being allowed to season, after which it may be properly sized, polished, and otherwise put in a condition for sale.

Heretofore spectacle and eyeglass frames, and the like, have been blanked out from seasoned cellulose material. Ordinarily the sheets of cellulose material measured about 21 inches by 50 inches, each sheet weighing approximately eight and one-half pounds, of which about about two and one-half pounds were actually used in the structure of the frames, while the remaining six pounds were waste. The seasoned sheet stock as purchased cost approximately $1.20 a pound, while the waste material sells for an average of about ten cents a pound, and as about 75 per cent of the original seasoned stock was waste, many thousands of dollars were lost annually with a resultant high cost of manufacture. The scrap above referred to could not be re-worked so as to produce first grade sheets for this work, and due to the fact that the re-working is an expensive proposition, was hardly worth while to re-claim this waste material to form second grade stock. However, when the waste material is used in the production of second grade stock, care must be exercised in keeping different types of the material separated, that is, keeping batches having different dyes or colors segregated, and when re-working, mixing this scrap material with new stock, and working the same together. The resultant material is called stuffed stock, which is a poor class or second grade material and which cannot be used by the manufacturers of high class and high grade spectacle and eyeglass frames.

In the manufacture of cellulose composition material used in the making of spectacle and eyeglass frames in the optical art, a suitable cellulose such as tissue paper or purified cotton is nitrated in such a manner that the product contains a suitable per cent of nitrogen; very commonly a mixture of sulphuric acid and nitric acid is used in this nitration process. After the cellulose is passed through the nitration process, which may be a centrifugal operation, the material is thoroughly washed in water, after which it is dried, and mixed with a composition of camphor and alcohol in suitable mixing machines, or, if desirable, between steel rollers. If it is desired to produce a mottled effect, as for instance to create an imitation of tortoise shell, or the like, a mixture of two or more colors is introduced into this mixture which is called pyroxylin. This mixing with the camphor and alcohol forms the composition into a pasty mass or dough which has been provided with the desired coloring matter either by mixing or passing the material through suitable rollers which may be either smooth or corrugated. The pasty mass is then pressed into a block by preferably hydraulic pressure under heat, after which it is cooled, which cooling causes the material to become very stiff. After this has been pressed into a block it is planed or cut into sheets of the desired thickness, after which it is allowed to season. As the material issues from the mixing machine and is pressed to shape it is known as green stock. After this green stock has been allowed to stand for a definite length of time it becomes what is known as seasoned stock, and in this condition is then ready for formation into such objects as spectacle and eyeglass frames. It is an expensive operation to season this stock because it takes about two months to season sheet stock .135 thick, staying all this time in dry kilns heated about 100 to 110 degrees constantly.

After these sheets have become seasoned the blanks for the said frames are stamped therefrom, after which the blanks are suitably milled, grooved, shaped and polished to form a finished article. Of course, it will be seen that due to the shape of the mounting it is impossible to prevent the enormous amount of seasoned material that has heretofore been wasted in the stamping operation, and as above referred to in actual practice, with the greatest conservation of space on the blank, about 75 per cent of every sheet is scrapped.

In accordance with the present invention the cellulose composition material is formed by nitrating the cotton or other form of cellulose, washing the cellulose after the nitration step, mixing the same with camphor and alcohol at the same time adding the desired coloring matter, then pressing or squeezing the massy dough into a solid cake or block, after which the solid cake or block is reduced into sheets and after forming these sheets from the block to stamp or blank out blanks for the spectacle and eyeglass frames, and the like. In other words, I stamp out the blanks from the green stock before it has had time to season, as has heretofore been done. After stamping out these blanks I place the scrap or superfluous material back into the machine, and re-work it, so that it is again formed into a solid cake and sliced into sheets as above referred to. In other words, by stamping the blanks from the green stock it is possible to re-work the excess so as to form new sheets for stamping the re-claimed stock.

By saving approximately 75 per cent loss in the utilization of the sheet cellulose composition material by changing the stamping operation of the blanks from the seasoned stock to the green stock material, I have set forth an entirely new and valuable process for the manufacture of these articles from the cellulose composition material. After these blanks have been stamped out they are set aside to season, as has heretofore been done with the sheet stock, so that ultimately we have the same form of material in the mounting, but in the formation thereof we have obviated the large amount of wastage heretofore experienced.

In stamping out these blanks allowances will be made for the shrinkage that ordinarily takes place during the seasoning process. We now season two and one-half pounds instead of eight and one-half pounds, and blanks season quicker than the solid sheet due to their shape and size.

It is to be understood that the form of the invention herewith shown and described is to be taken as a preferred embodiment of the invention, and that various changes may be made without departing from the spirit of the invention or the scope of the subjoined claims.

Having thus described my invention, I claim:

1. The process of making spectacle and eyeglass frames and the like from cellulose composition material consisting of making a sheet of unseasoned cellulose composition material and then blanking out substantially the exact shape of frame from the unseasoned material.

2. The process of making spectacle and eyeglass frames and the like from cellulose composition material consisting of making a sheet of unseasoned cellulose composition material, blanking out the frames substantially to exact shape from the unseasoned material, and thereafter seasoning the frames to the proper degree.

3. The process of making spectacle and eyeglass frames and the like from cellulose composition material consisting of blanking out the frames substantially to exact shape from unseasoned cellulose composition material and then returning the cuttings from the cellulose to the base stock to be re-used as the process is continued.

4. The process of making spectacle and eyeglass frames and the like from cellulose composition material consisting in blanking out the frames from unseasoned stock, returning the cuttings from the unseasoned stock to the base stock to be re-used as the process continues, and seasoning the blanked out frames.

5. The process of making spectacle and eyeglass frames and the like from cellulose composition material consisting in preparing a sheet of unseasoned cellulose composition material, blanking out frames therefrom, allowing the unseasoned frames to season and then shaping and polishing the frame.

6. As a new article of manufacture, a blank of the character described formed from unseasoned cellulose composition material.

7. As a new article of manufacture, a blank for forming spectacle and eyeglass frames and the like stamped to substantially exact shape from a sheet of unseasoned cellulose composition material.

8. As a new article of manufacture, a frame blank of the character described stamped from a sheet of unseasoned material and seasoned.

9. The process of making cellulose, composition material articles consisting in preparing a sheet of unseasoned cellulose composition material and then blanking out the articles to substantially exact shape from the unseasoned material.

10. The process of making cellulose composition material articles consisting in preparing a sheet of unseasoned cellulose composition material, blanking out the article from the unseasoned material, and thereafter seasoning the articles.

11. As a new article of manufacture, a blank for forming cellulose composition material articles stamped to substantially exact shape from a sheet of unseasoned cellulose composition material.

12. As a new article of manufacture, a cellulose composition material article stamped from a sheet of unseasoned material, and seasoned.

ELMER L. SCHUMACHER.